Patented Mar. 15, 1938

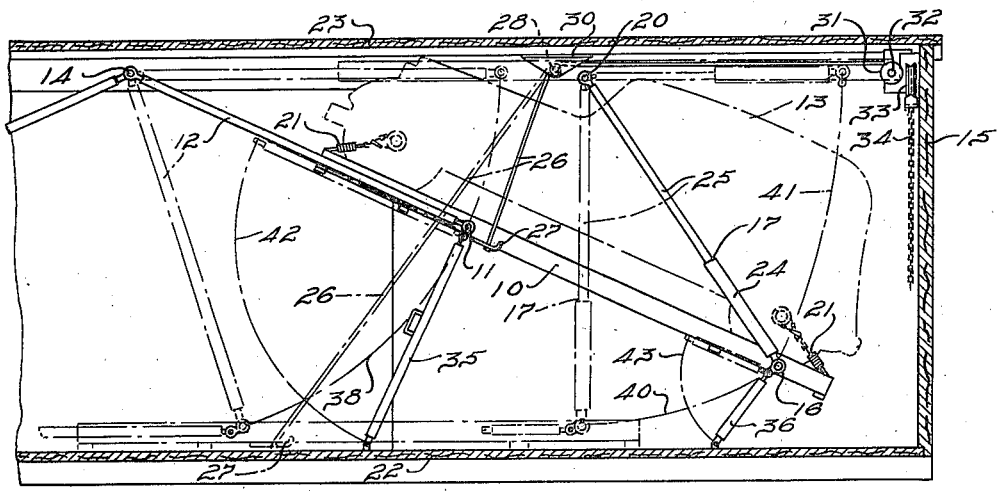

2,111,191

UNITED STATES PATENT OFFICE 2,111,191

CAR LOADING DEVICE

Sulo Michael Nampa, Detroit, Mich., assignor to The Worth Company, a corporation of Michigan Application July 18, 1934, Serial No. 735,774

3 Claims. (Cl. 287—92)

This invention relates to car loading devices and more especially to mechanism for disposing an automobile in a semi-decking position for transportation purposes.

In certain respects the invention relates to a copending application of Samuel D. Butterworth, for Car loading device, Serial No. 464,830, filed December 12, 1932, and assigned to the same assignee as is the present application.

Among the objects of the invention are: to provide under-supporting members pivotally connected with respect to the decking frame and adapted to swing to an out-of-the-way position to allow the decking frame to be lowered to a floor position for loading and unloading a vehicle and to allow the decking frame to be elevated to a substantially horizontal position closely adjacent the roof of a freight car; to provide a novel means for pivotally connecting an under-supporting member with respect to a vehicle decking frame for freight cars; to facilitate the fastening of such pivotal connection to an under-supporting member; and to provide a connecting means which is of compact, light weight construction, which can be manufactured economically, which can be readily installed, and which is strong and durable in operation.

Other objects, features and advantages will become apparent from the following description and appended claims.

For the purpose of illustrating the genus of the invention, a typical concrete embodiment is shown in the accompanying drawing, in which:

Figure 1 is a fragmentary, vertical, longitudinal section of a portion of a freight car and illustrates more or less diagrammatically the arrangement therein of a car loading device constructed substantially according to the preferred form of this invention;

Figs. 2 and 3 are enlarged detail, side and end elevations, respectively, of parts shown in Fig. 1;

Fig. 4 is an exploded view of parts shown in Fig. 3; and

Fig. 5 is a section taken substantially on the line 5—5 of Fig. 2.

Referring to Fig. 1 of the drawing, there is shown a decking frame 10 which is pivotally connected at its forward end, as indicated at 11, to the lower end of a pair of suspension rods 12 disposed on opposite sides of the decking frame with these rods extending upwardly and having their upper ends pivotally connected, as indicated at 14, to metal parts of the frame of the freight car, indicated generally at 15. The rear portion of the frame is pivotally connected at opposite sides, as indicated at 16, to another pair of oppositely disposed suspension rods 17 which have their upper ends pivoted, as indicated at 20, also to metal parts of the car frame. But one of the rods 12 and 17 of each of the pairs of suspension rods is shown in Fig. 1, but it will be understood that similar rods are correspondingly disposed upon the opposite side of the frame 10. The suspension rods 12 and 17 are preferably tubular in form.

A decked automobile, indicated in dot-and-dash outline at 13, may be secured by suitable fastening means 21 to opposite ends of the frame 10. As shown in Fig. 1 in full lines, the frame 10 is in semi-decking position and, as shown in dot-and-dash lines, this frame may assume a position adjacent and parallel to the car floor 22 or may assume a similar position with respect to the car roof 23. The frame 10 in the position on or adjacent the floor 22 is adapted to have the automobile 13 rolled on off the frame, and when the frame is in the position adjacent the roof 23, it is parallel and closely adjacent the roof of the freight car so that the latter may be used for the transportation of a load, such as a return load, of a different character from automobiles. As shown in Fig. 1, the frame 10 is in the floor position when the front pair of suspension rods 12 are inclined forwardly with respect to a vertical frame, while the rear suspension rods 17 are disposed substantially in a vertical plane.

Each of the suspension rods 17 is of telescopic character and includes a lower tubular portion 24 which is large enough to receive a smaller upper tubular portion 25 having its inner or lower end enlarged or provided with stop means adapted to engage a shoulder or other stop means at the upper end of the lower tubular portion to limit the amount by which the telescopic portions of the rods 17 may be extended relative to one another. Cables 26 may be provided at each side of the frame 10 for raising the frame and causing the suspension rods 12 and 17 to pivot about their upper pivotal connections 14 and 20 to move the frame longitudinally of the freight car 15 from the floor position to the full line or semi-decking position and from this position to the roof position. The cables 26 are attached to the frame 10 adjacent the pivots 11 upon opposite sides of the frame by brackets such as indicated at 27. The cables 26 extend upwardly and are trained over pulleys 28 mounted in brackets 30 preferably attached to the metal framing of the roof structure of the freight car 15. The cables then extend substantially parallel to the roof to a point adjacent the end wall of the freight car, where they are trained over drums 31 mounted on a rotary shaft 32. This shaft may be operated through a suitable worm wheel and worm gear or other desired reduction driving means operable by means of a sprocket wheel 33 upon which a chain 34 is trained. The chain 34 extends downwardly along the end wall of the freight car to a point where it is convenient for manual manipulation to elevate the frame 10 from its lowered or floor position to the semi-decking and roof position. The frame, together with an automobile thereon, due to the gear or other desired reduction driving means interposed between the sprocket wheel 33 and the drum 31 may be raised by manual manipulation of the chain 34 without excessive effort. When the frame 10 is in the floor position, due to the inclination of the forward suspension rods 12 and to the substantially vertical disposition of the suspension rods 17, all of the suspension rods will pivot about their upper pivotal connections 14 and 20 as the frame is elevated from the floor position, and the frame will assume the semi-decking position inclined to the vertical as shown in full lines in Fig. 1. When the frame is in this position and an automobile 13 fastened thereon, it is preferred to use under-supporting members 35 and 36 pivoted to each side of the frame 10 and which may be releasably connected to the metal framing normally provided beneath the floor 22 of the freight car 15 whereby to provide a very rigid mounting for the frame 10 and the load carried thereby during transportation.

To effect the automatic positioning of the decking frame 10 adjacent the roof 23 of the freight car 15 and substantially parallel thereto, outwardly projecting members 37 are provided at the forward end of the frame and on opposite sides thereof, which members are adapted to engage the under faces of the suspension bars 12 when the frame 10 reaches semi-decking position or slightly thereafter so that the frame 10 cannot rotate beyond a straight line position about the pivot 11 in a clockwise direction with respect to the suspension bars 12 while the frame is being moved from semi-decking to roof position. The suspension rods 17 will not interfere with this movement from semi-decking to roof position due to the telescoping character thereof, the rods 17 becoming shorter in effect as the frame is raised from semi-decking to roof position, and in the latter position, the rods 17 will lie substantially parallel and along the sides of the frame 10.

When the frame 10 is not loaded with an automobile, it may be moved from floor position to roof position by manipulating the chain 34 to tension the cables 26, the lower pivoted ends 11 of the suspension bars 12 swinging through the arc indicated at 38 during this operation. The lower ends 16 of the suspension rods 17 move through the arcs 40 and 41 during the elevation of the decking frame from the floor position to the roof position. When the frame 10 reaches the semi-decking position, or slightly thereafter, the outwardly projecting members 37 engage the undersides of the suspension rods 12 and remain in contact therewith as the frame is elevated to roof position. The under-supporting members 35 and 36 are pivotally connected to the lower ends of the suspension rods 12 and 17 and when the lower ends of the under-supporting members are detached from the car, they may be swung through the arcs 42 and 43, respectively, to positions substantially parallel with the frame 10. The under-supporting members may be fastened to the frame 10 by any suitable means and remain parallel thereto while the frame is elevated to roof position.

Reference may now be had to Figs. 2 to 5, inclusive, which illustrate the preferred means employed for pivotally connecting the suspension rods 12 and 17 and the under-supporting members 35 and 36 to the frame 10 and for pivotally connecting each of the suspension rods to an under-supporting member. The construction shown in these figures is that adapted to pivotally connect the lower ends of the suspension rods 12 and the upper ends of the under-supporting members 35 to each other and to the frame 10, or similarly to connect the suspension rods 17 and the under-supporting members 36 to the frame 10, in the structure depicted in Fig. 1. For the purpose of illustration, the means for connecting the suspension rods 12 and the under-supporting members 35 to the frame 10 is shown, it being understood that similar means is employed to interconnect the suspension rods 17 and under-supporting members 36 to each other and to the decking frame.

The connecting means preferably comprises an element 44 provided with a cylindrical plug portion 45 adapted to be received in the lower end of a suspension rod 12, for example, and to be welded, as indicated at 46, or otherwise suitably secured to this rod so as to support the weight of the decking frame and any load carried thereby from the suspension rods. The element 44 is provided with a bearing opening 47 for receiving the pivot elements, indicated at 11 in Fig. 1, to connect the elements pivotally to the frame 10. The plug portion 45 may be disposed at a slight angle with respect to the plane of the remainder of the element 4, if desired, as indicated in Fig. 3. The element 44 is provided with an ear portion 50 arranged in offset relation with respect to the central portion of the element 44 as indicated in Figs. 3 and 4.

The eye portion 50 of the element 44 is adapted to engage an eye portion 51 of a hairpin or U-shaped element 52 provided with leg portions 53 adapted to be received within one end of the tubular under-supporting member 35. As will be noted with reference to Figs. 3 and 4, the eye portion 51 is of greater lateral dimension than the leg portions 53 so as to provide a stop, as indicated at 54, for limiting the extent to which the member 52 extends into the tubular under-supporting element 35. As will be noted with reference to Fig. 5, the leg portions 53 of the U-shaped element 52 are substantially oval in cross section with the outer faces thereof conforming substantially with the inner periphery of the tubular element 35. A plug element 55 is also adapted to be disposed within the upper end of the tubular under-supporting member 35 and is of such cross section that in conjunction with the legs 53 of the U-shaped element 52 it substantially fills the end of the tubular member 35. The plug element 55 may be provided with one or more stops 56 for limiting the extent to which the plug element extends into the tubular member 35.

In assembling the elements above described, one leg 53 of the U-shaped or hairpin-like element 52 is projected through the eye portion 50 of the element 44 until the eye 51 engages the eye 50. The leg portions 53 of the element 52 are then disposed within grooves 57 provided in the plug element 55 and the elements 52 and 55 are inserted within the tubular member 35 until the stops 54 and 56 engage the end of the tubular member. The upper end of the plug element 55 is provided with notches 58 extending to a depth slightly below the bottoms of the groove 57 to provide sufficient clearance so that the plug element 55 may be welded in a vicinity of these notch portions to the U-shaped element 52. This weld is indicated at 60 in Fig. 3. The outer periphery of the plug element 55 and the outer faces of the leg portions 53 of the U-shaped element 52 are welded to the upper end of the tubular member 35 preferably about the entire periphery of the latter. The latter weld is indicated at 61 in Fig. 3.

As many changes could be made in the above construction and many apparently widely different embodiments of this invention could be had without departing from the spirit thereof, it is intended that all matter contained in the above description or shown in the accompanying drawing shall be interpreted as illustrative and not in a limiting sense.

What is claimed is:

1. As an article of manufacture, a connecting means for a tubular under-supporting member, said means comprising a U-shaped element provided with an eye portion intermediate the leg portions thereof, the leg portions of said element being adapted to be received within an end of said tubular member with the eye portion projecting outwardly of said end, said eye portion forming a stop for limiting the extent to which the leg portions may project into said end of the tubular member, a plug element adapted to be disposed within said end of the tubular member and in conjunction with said leg portions of the U-shaped member substantially to fill said end of the tubular member, said plug element being provided with a stop for limiting the extent to which it may project into said end of the tubular member, said plug element and said U-shaped element being welded to each other and to the tubular member.

2. As an article of manufacture, a connecting means for a tubular under-supporting member, said means comprising a U-shaped element provided with an eye portion intermediate the leg portions thereof, the leg portions of said element being adapted to be received within an end of the tubular member with said eye portion projecting outwardly of said end, a plug element adapted to be disposed within said end of the tubular member and provided with grooves for the reception of the leg portions of said U-shaped element, said plug element being provided with notches adjacent one end thereof extending to a depth below the level of the bottom of said grooves, said plug element and the leg portions of said U-shaped element being adapted substantially to fill the end of the tubular member, said plug element and said U-shaped element being welded to each other adjacent the notched portion of said plug element and the plug and U-shaped element being welded to the upper end of the tubular member.

3. As an article of manufacture, means for connecting a pair of tubular support members to each other, said means comprising a pair of eye members interconnected to each other for pivotal movement, each eye member having a plug portion disposed within and adapted to be secured to one of said tubular support members, one of said eye members being provided with a pair of bearing openings.

SULO MICHAEL NAMPA.